Patented Aug. 29, 1933

1,925,063

UNITED STATES PATENT OFFICE

1,925,063

WAX-LIKE ESTERS AND METHOD OF PREPARING THE SAME

Donald K. Tressler, Pittsburgh, Pa., assignor to The Mathieson Alkali Works, Inc., New York, N. Y., a corporation of Virginia No Drawing. Application December 4, 1929
Serial No. 411,700

14 Claims. (Cl. 260—106)

This invention relates to new wax-like products and to a new method of preparing the same.

The new wax-like products are condensation products of chlorhydrins of unsaturated fats, fatty acid esters, fatty acid ketones, or fatty acids with soaps.

I have found that the chlorhydrins of the fatty acids, fatty acid esters, and fatty acid ketones, including the simple esters and glycerides, form new and valuable wax-like products by fusion with soaps of the alkali or alkaline earth metals. The new wax-like products vary from viscous liquid waxes to soft and even hard waxes of varying properties, depending upon the chlorhydrin and soap which are condensed with each other.

Unsaturated fatty acids, such as oleic acid, can be readily converted into chlorhydrins by treatment with hypochlorous acid as illustrated by the following equation:

$$CH_3(CH_2)_7CH:CH.(CH_2)_7COOH + HOCl \longrightarrow CH_3(CH_2)_7CHOH.CHCl(CH_2)_7COOH$$

This chlorhydrin readily gives up water to form an ester with a lactone linkage as indicated by the following equation:

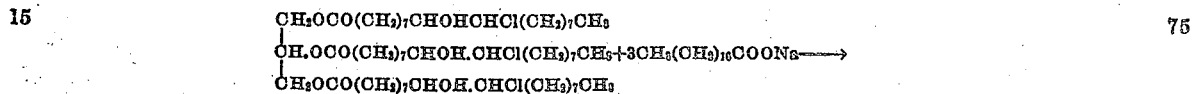

When this lactone-like compound is fused with a soap it is converted into an ester as illustrated graphically by the following equation:

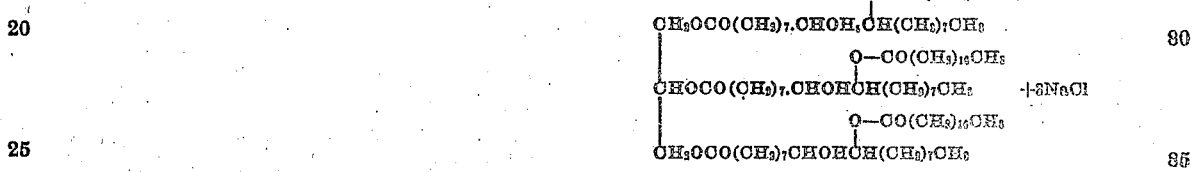

In a companion application, Serial Number 411,699 filed of even date which has matured into Patent No. 1,873,072, I have described new chlorhydrins of unsaturated fatty acid ketones which can be made by treating the unsaturated fatty acid ketones with a cold solution of hypochlorous acid. These new chlorhydrins and those of fatty acid esters can similarly be condensed with soaps of the alkali and alkaline earth metals to form new wax-like condensation products or esters. The condensation of trichlorhydrin of olein with sodium stearate is illustrated graphically by the following equation.

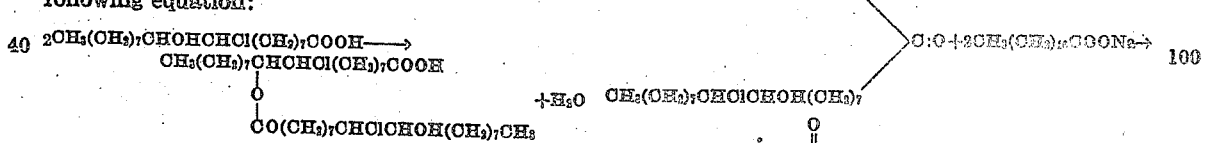

The chlorhydrin of ethyl oleate will similarly react with sodium stearate as indicated by the following equation:

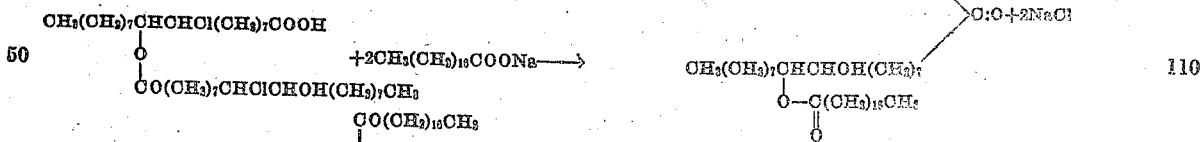

The chlorhydrin of oleone will similarly react with sodium stearate as indicated by the following equation:

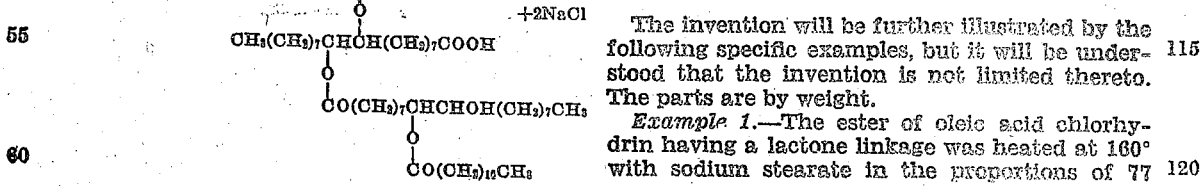

The invention will be further illustrated by the following specific examples, but it will be understood that the invention is not limited thereto. The parts are by weight.

*Example 1.*—The ester of oleic acid chlorhydrin having a lactone linkage was heated at 160° with sodium stearate in the proportions of 77 parts of ester to 100 parts of sodium stearate using a reflux condenser. After prolonged heating for about 93 hours the reaction product was allowed to cool and then extracted with 2,000 parts of petroleum ether. This solvent extracted the waxy condensation product while leaving the unchanged soap behind. Upon distillation of the solvent the condensation product was obtained as a viscous liquid wax. It had an acid value of 48.3.

Example 2.—Lard oil was treated with hypochlorous acid solution to form a viscous chlorhydrin containing 11.9 per cent. of chlorine. 50 parts of this product were heated with 60 parts of sodium stearate at 177° C. for 40 hours. After cooling the ester resulting from the condensation was extracted with petroleum ether, the ether distilled from the extract, and the residue allowed to stand. After about 36 hours the soft crystals were separated by filtration and purified by recrystallization, giving a purified product having a melting point of 46–48° C.

Example 3.—50 parts of the chlorhydrin of ethyl oleate were heated with 65 parts of sodium stearate at 160° C. for 90 hours. The product was then cooled and the condensation product extracted with petroleum ether. Upon distilling the petroleum ether from the extract the crude ester or condensation product was obtained as a viscous liquid wax.

Example 4.—20 parts of oleone chlorhydrin containing 11.2 per cent. chlorine prepared as described in my companion application were heated with 21 parts of sodium stearate at about 137° for 83 hours. After cooling, the wax formed by the condensation was extracted with petroleum ether. Upon distillation of the petroleum ether from the extract 24 parts of a soft wax were obtained.

In general the esters produced from unsaturated fatty acids or simple esters by condensation with soap are more or less viscous liquid waxes, while those produced by condensing the chlorhydrins of triglycerides with soaps are waxes of varying degrees of softness. Such waxes are suitable for use for various purposes, such as the preparation of emulsions, for the waterproofing of paper and fabrics, and for other purposes.

The new esters formed by the condensation with soaps of chlorhydrins of the free fatty acids or their esters with a lactone linkage are acidic in character. The new wax-like products produced by the condensation of the chlorhydrins of glycerides or other esters with soaps are non-acidic and in general are solid waxes. They are valuable for use where neutral waxes are desired.

It will be understood that the commercial fatty acids as well as the commercial glycerides are made up of mixtures of different acids or glycerides. Commercial oleic acid or red oil, for example, is a mixture containing other fatty acids than oleic acid, such as linoleic acid, stearic acid, etc. The chlorhydrins formed from such fatty acids or glycerides would accordingly be mixed chlorhydrins and the wax-like products produced by condensation of the chlorhydrins with soap will similarly be mixed products depending upon the particular fatty acids or glycerides employed.

I claim:

1. As a new product the condensation product of a higher fatty acid soap with the chlorhydrin of an unsaturated fatty acid.

2. As a new product the condensation product of a higher fatty acid soap with the chlorhydrin of an unsaturated fatty acid ester.

3. As a new product the condensation product of a higher fatty acid soap with the chlorhydrin of an unsaturated fatty acid glyceride.

4. As a new product the condensation product of a higher fatty acid soap with the chlorhydrin of an unsaturated fatty acid ketone.

5. As a new product the wax-like product obtainable by the condensation of a higher fatty acid soap with the chlorhydrin of an unsaturated higher fatty acid glyceride.

6. As a new product the condensation product of a higher fatty acid soap with the chlorhydrin of an unsaturated fatty acid esters having a lactone linkage.

7. As a new product the compound having the formula $$R.CHOH.CH.R_1$$
$$\phantom{R.CHOH.C}|$$
$$\phantom{R.CHOH.}OOC.R_2$$

where $R_1$ and $R_2$ are alkyl groups and $R$ is a di-glyceride, fatty acid ester or fatty acid ketone radical.

8. As a new product the compound having the formula $$R.CHOH.CH.R_1$$
$$\phantom{R.CHOH.C}|$$
$$\phantom{R.CHOH.}OOC.R_2$$

where $R$ and $R_2$ are alkyl groups and $R_1$ is a fatty acid ester radical having a lactone linkage.

9. As a new product the condensation product of a higher fatty acid soap with the chlorhydrin of a compound from the group of compounds consisting of unsaturated fatty acids, unsaturated fatty acid esters, and unsaturated fatty acid ketones.

10. The method of producing new wax-like products, which comprises condensing the chlorhydrin of an unsaturated fatty acid with a soap of the alkali or alkaline earth metals.

11. The method of producing new wax-like products, which comprises condensing a chlorhydrin of an unsaturated fatty acid ester with a soap of the alkali or alkaline earth metals.

12. The method of producing new wax-like products, which comprises condensing the chlorhydrin of an unsaturated fatty acid ketone with a soap of the alkali or alkaline earth metals.

13. The method of producing new wax-like products, which comprises condensing with a soap of the alkali or alkaline earth metals a compound from the group of compounds consisting of the chlorhydrins of unsaturated fatty acids, fatty acid esters, and fatty acid ketones.

14. The method of producing new wax-like products, which comprises condensing the chlorhydrin of an unsaturated fatty acid ester having a lactone linkage with a soap of the alkali or alkaline earth metals.

DONALD K. TRESSLER.